United States Patent [19]
Rastelli

[11] Patent Number: 6,116,415
[45] Date of Patent: Sep. 12, 2000

[54] PROTECTIVE TIRE COVER WITH DETACHABLE CENTER SECTION FOR CHANGING AND HANDLING A TIRE

[76] Inventor: Michael Rastelli, 7-15 154$^{th}$ St., 1$^{st}$ Floor, Whitestone, N.Y. 11357

[21] Appl. No.: 09/313,604

[22] Filed: May 18, 1999

[51] Int. Cl.$^7$ ........................................................ B65D 65/02
[52] U.S. Cl. ........................................... 206/304.1; 224/42.2
[58] Field of Search ................................. 150/154, 166, 150/901; 206/304, 304.1, 304.2; 224/42.2, 42.12, 42.24, 42.26

[56] References Cited

U.S. PATENT DOCUMENTS

| | | | |
|---|---|---|---|
| D. 306,995 | 4/1990 | Reed, Jr. | D12/202 |
| 1,461,021 | 7/1923 | Bate . | |
| 1,504,907 | 8/1924 | Sandusky . | |
| 1,689,438 | 10/1928 | Jellison | 206/304.1 |
| 1,691,939 | 11/1928 | Sanchez | 206/304 |
| 1,704,555 | 3/1929 | Cluff . | |
| 1,718,969 | 7/1929 | Lockwood | 224/304 |
| 2,348,084 | 5/1944 | MacChesney et al. | 206/304 |
| 4,126,169 | 11/1978 | Magnuson et al. | 206/304.1 |
| 4,214,683 | 7/1980 | Wills et al. | 224/42.2 |
| 4,516,706 | 5/1985 | Niehaus | 224/42.2 |
| 4,787,331 | 11/1988 | Jarvis | 118/504 |
| 4,844,005 | 7/1989 | Filomeno | 118/504 |
| 4,932,573 | 6/1990 | Flint | 224/42.12 |
| 5,076,447 | 12/1991 | Colgan | 224/42.2 |
| 5,228,608 | 7/1993 | Stout, III | 224/42.13 |
| 5,667,590 | 9/1997 | Simons, Sr. | 118/504 |
| 5,921,449 | 7/1999 | Saegusa et al. | 224/42.2 |

FOREIGN PATENT DOCUMENTS 443998 8/1998 Germany .

*Primary Examiner*—Jim Foster
*Attorney, Agent, or Firm*—Michael I. Kroll

[57] ABSTRACT

A tire and wheel cover (10) with one size to expand over many size tires and wheels. Two sections of covering material are used, a detachable center section (16) for viewing the wheel and a wide circumferential section of material (12) for covering the tire. The two sections being removably attached to each other allowing for viewing of the wheel (24). The circumferential section of material (12) rear side having a hollow infold (28) with an elastic cord (18) inside.

8 Claims, 4 Drawing Sheets

PROTECTIVE TIRE COVER WITH DETACHABLE CENTER SECTION FOR CHANGING AND HANDLING A TIRE

BACKGROUND

1. Field of Invention

This invention is for any event in which a person is handling a tire.

2. Description of Prior Art

The covering of a tire and wheel is a common invention in use today. Tire covers are used for appearance purposes to enhance the overall look of a vehicle and some have an added feature to reduce theft of a spare tire, and spare tire and wheels.

Originally spare wheels and tires of a vehicle were oftentimes covered on the exteriors of vehicles for vanity purposes, and the overall appearance of the vehicle. This was the case in Patents issued many years ago such as U.S. Pat. Nos. 1,504,907; 1,704,555; 1,718,969 and particularly U.S. Pat. No. 1,461,021 issued to W. G. Bate in 1923.

Thereafter, and in more recent times, spare wheels and tires were stored inside of trucks and fender wells and no appearance covers were used. In recent times, especially in reference to recreational vehicles, small trucks and vans, spare wheel and tire combinations are being mounted again on the exterior of vehicles. For this reason, spare wheel tire covers are back in style as in U.S. Pat. Nos. 4,1261,169; 4,516,706 can attest to. These covers are for spare tire and wheels that are fixed externally on the vehicle. U.S. Pat. No. 4,126,169 to Magnunson (1978) shows a cover which is a one size fits all cover that has drainage openings in the event of rainfall or when one is washing the vehicle. The cover is mounted externally on the vehicle covering the wheel and tire; however, this type of cover is only made for covering the tire and wheel applications outside of the vehicle for vanity purposes. U.S. Pat. No. 4,516,706 to Niehaus (1985) shows a spare tire cover that has a locking device to reduce or eliminate thief of the tire. The locking device for a spare tire can be made without a cover, therefore, the cover is for vanity purposes only since the cover may be painted or otherwise decorated to blend with the vehicle's appearance.

Although there are other covers such as U.S. Pat. No. 5,228,608 to Stout, III (1993); D306, 995 To Reed, Jr.; U.S. Pat. No. 4,214,683 to Wills, ET. Al. (1980); U.S. Pat. No. 5,076,477 to Colgan (1991); U.S. Pat. No. 4,932,573 to Flint (1990), these covers all have one thing in common as stated in their patents, they are all tire covers with a main purpose being to cover a tire and wheel. One of these, U.S. Pat. No. 5,228,608 issued to Stout, III, shows a tire cover and article carrier for a tire and wheel that is mounted on the exterior of a vehicle. It has an article holder attached to the cover, but again the cover is there for vanity purposes that are non-functional in nature.

There are other patented covers for the protection of a tire and wheel when painting a car such as U.S. Pat. No. 5,667,590 to Simons, Sr. (1997); U.S. Pat. No. 4,787,331 to Jarvis (1988); U.S. Pat. No. 4,844,005 to Filomeno (1989). The sole purpose of these covers is for the tire and wheel remaining free of over spray when painting the vehicle.

All of the previously practiced methods have primarily the same basic pitfalls. They are all tire covers to cover a tire or spare tire and wheel for the one act of covering. This is of very limited use, as the only function is to cover a tire and wheel or a spare tire and wheel.

There are many different tire covers. They range from covers to prevent spray painting or other materials from being introduced onto a tire or tire and wheel. There are covers that are made to cover a wheel rim. This type of cover is used in the event that one would be using harsh solvents to clean a tire without allowing the harsh solvent to come in contact with the wheel and rim assembly. There are covers made for appearance purposes only, having no other function. Tire covers use for advertising purposes, but again for appearance purposes, and tire covers that have locking systems that's other use beside appearance is to be a deterrent from stealing the spare tire and wheel off a vehicle. All of the tire covering inventions heretofore know suffer from a number of one or more of these disadvantages.

(a) Their main purpose is for the covering and or overall appearance of a tire or spare tire and wheel.

(b) Their function is of limited use since they only act to conceal a tire.

(c) They are put on a tire for a specific use, such as in the act of spray painting a car, or shielding a tire from environmental elements.

(d) Since many vehicle owners do not use them at all, they are more of a luxury item rather than a necessity (e) Cars, in particular, never have a need for a spare tire being covered since the spare tire and wheel is mainly in the vehicle and out of sight.

(f) Many vehicles that generally use the tire covers have none at all. Some vehicle owners like the look of a spare tire or spare tire and wheel on the exterior of their vehicle.

(g) Since many spare tire covers are used on the exterior of a vehicle they are an easy item to steal.

OBJECTS AND ADVANTAGES (a) To provide a tire cover which has many uses other than appearance purposes.

(b) To provide a cover that acts as a protector in case of a tire emergency on the roadway.

(c) To provide a tire cover that acts as a shield from getting oneself filthy in all types of situations when one is working on a tire and or tire and rim.

(d) To provide a tire cover that is used as a protector between the inside of a vehicle and the tire itself in the event of putting the tire inside the vehicle (e) To provide a tire cover that is used as a protector from getting oneself dirty in any event that would facilitate the handling of a tire and or tire and wheel.

(f) To provide a tire cover with an opening in the middle in order to work on the wheel rim such as, when in the act of taking off the lug nuts.

(g) To provide a tire cover which can be seen at night because of its reflective abilities (h) To provide a tire cover which can be placed on and removed quickly and easily from various sized wheels and tires.

Further objects and advantages are to provide a tire cover that can be used many times over in various situations. A tire cover used to prevent a person from becoming filthy in the event of handling a tire. A tire cover used in the event of placing a tire in a vehicle, keeping the inside of the vehicle from becoming filthy. A tire cover that can be used to help other motorists see a person in the process of changing a tire because of its reflective abilities, and which can be used over a tire in the event of working on the lug nuts due to the detachable center section. Still further objects and advantages will become apparent from a consideration of the ensuing description and drawings.

DRAWING FIGURES

In the drawings, the figures show various views, aspects, functions, and desired embodiments of the present invention.

REFERENCE NUMERALS IN DRAWINGS

| | |
|---|---|
| 10 protective tire cover | 12 wide circumferential section of material |
| 14 opening | 16 detachable center section |
| 18 elastic material | 20 hook and loop material |
| 22 tire | 24 wheel |
| 26 lug nuts | 28 hollow infold |
| 30 vehicle | 32 tire jack |

Summary

Figure 3:
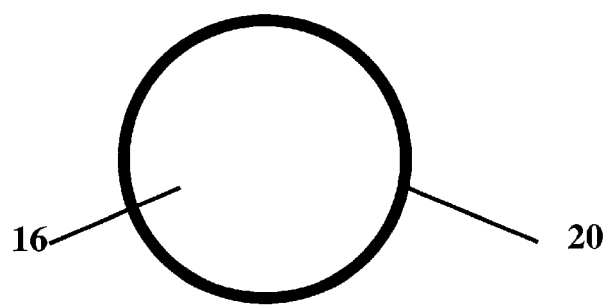
FIG. 3 shows hook and loop material around the circumference of the detachable center Section.

In accordance with the present invention a protective tire cover is comprised of a tire cover with a detachable section in the center hollow infold with an elastic cord inside.
Description—FIGS. 2 and 3

Figures 1, 2:
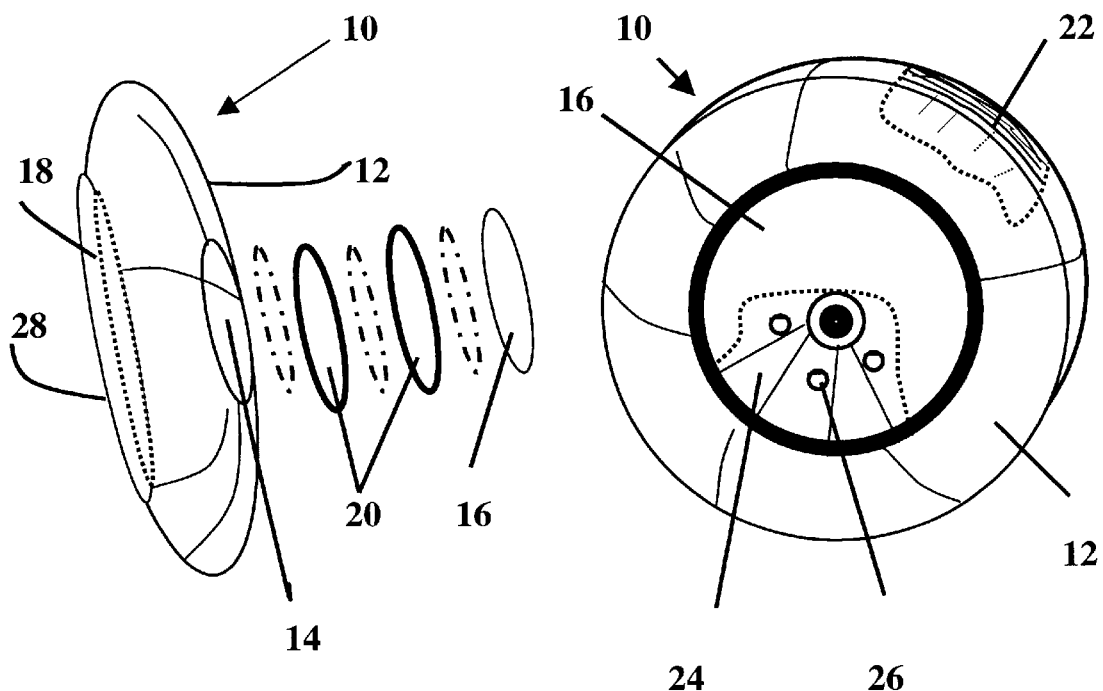
FIG. 1 shows a side view of the protective tire cover.
FIG. 2 shows a prospective front view of the protective tire cover over a tire with both the wide circumferential section of material and the detachable center section partially removed viewing the tire and wheel.
Figure 6:
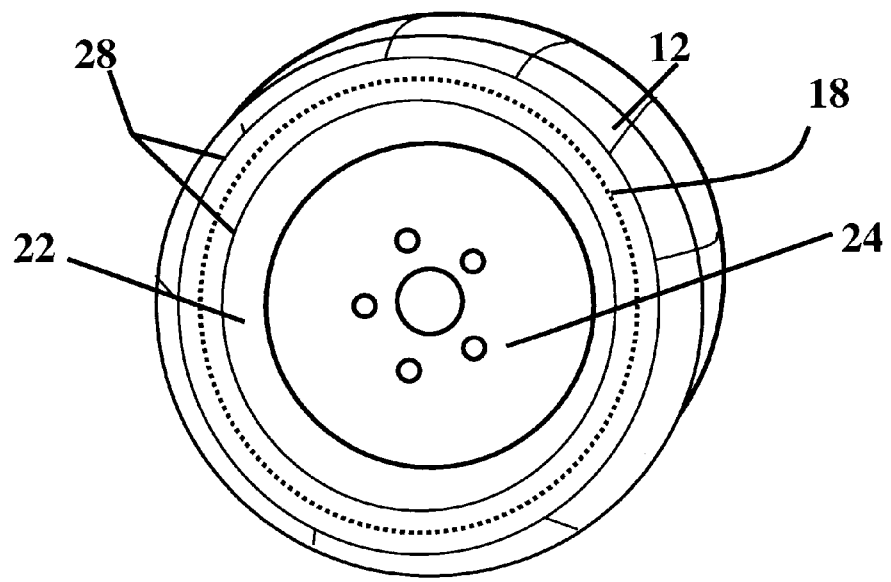
FIG. 6 shows a rear view of the protective tire cover over a tire and wheel.

In a typical embodiment of a protective tire cover 10 of this invention is illustrated in FIG. 2 (Front view) and FIG. 6 (rear view). There are two sections that make up the protective tire cover 10. The first section being the wide circumferential section of material 12 which is dimensioned to fit over the curved circumference of various sizes of tires, one being a tire 22 as shown in FIGS. 2 and 6. The other being the detachable center section 16 dimensioned to detachably cover the wheel of various sizes of wheels, one being a wheel 24 of the tire as shown in FIGS. 1,2,3 and 4.

Figure 5:
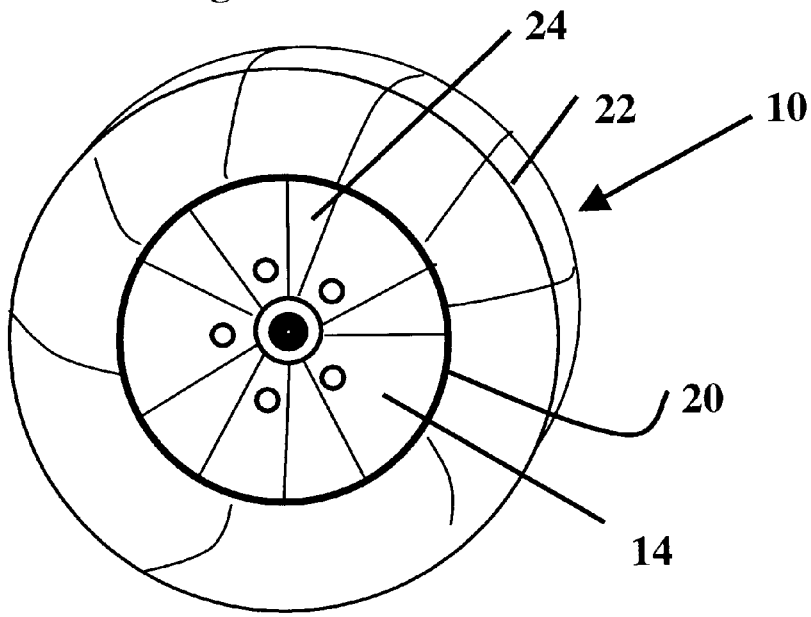
FIG. 5 shows a protective front view of the protective tire cover over a tire and wheel with the detachable center section completely removed.

As shown in FIG. 5, fastened around the front side circumference of the circumferential section of material 12 is a ring-shaped piece of hook and loop material 20 with self-adhesive backing. In this embodiment the shape of the detachable center section 16 is circular, shown in FIG. 3. It also has a ring-shaped piece of hook and loop material 20 with self-adhesive backing that fastens around its circumference. The detachable center section 16 overlaps the front circumference of the circumferential section 12. The two sections attaching together with the hook and loop material 20. forming the protective tire cover 10. In the preferred embodiment, the ring-shape pieces of hook and loop material 20 attach the detachable center section 16 to the circumferential section 12. However, the fastener material can be made out of any material that can attach and detach the two sections together such as snaps, buttons, zippers, etc. As shown in FIG. 1, the detachable center section 16 is detached from the circumferential section 12 leaving an opening 14.

The detachable center section 16, as well as, the circumferential section 12 are shown separated from the hook and loop material 20. In FIG. 5 the detachable center section is completely removed leaving the opening 14 uncovered exposing the wheel 24 and lugnuts 26.

FIG. 6 shows a rear or inside view of the circumferential section 12 over a tire 22. There is hollow infold 28 around the rear circumference of the circumferential section 12. The hollow infold 28 has elastic material 18 inside which is sewn together end to end. It should be noted that the protective tire cover 10 is dimensioned to work equally well with various size wheels and tires. In the preferred embodiment the protective tire cover is made out of a flexible material such as vinyl. However, it can be made from non-flexible material, nylon, leather, various plasticized materials, The protective tire cover can be made out of any color such as clear, red, orange, yellow, blue, black, etc.

Figure 7:
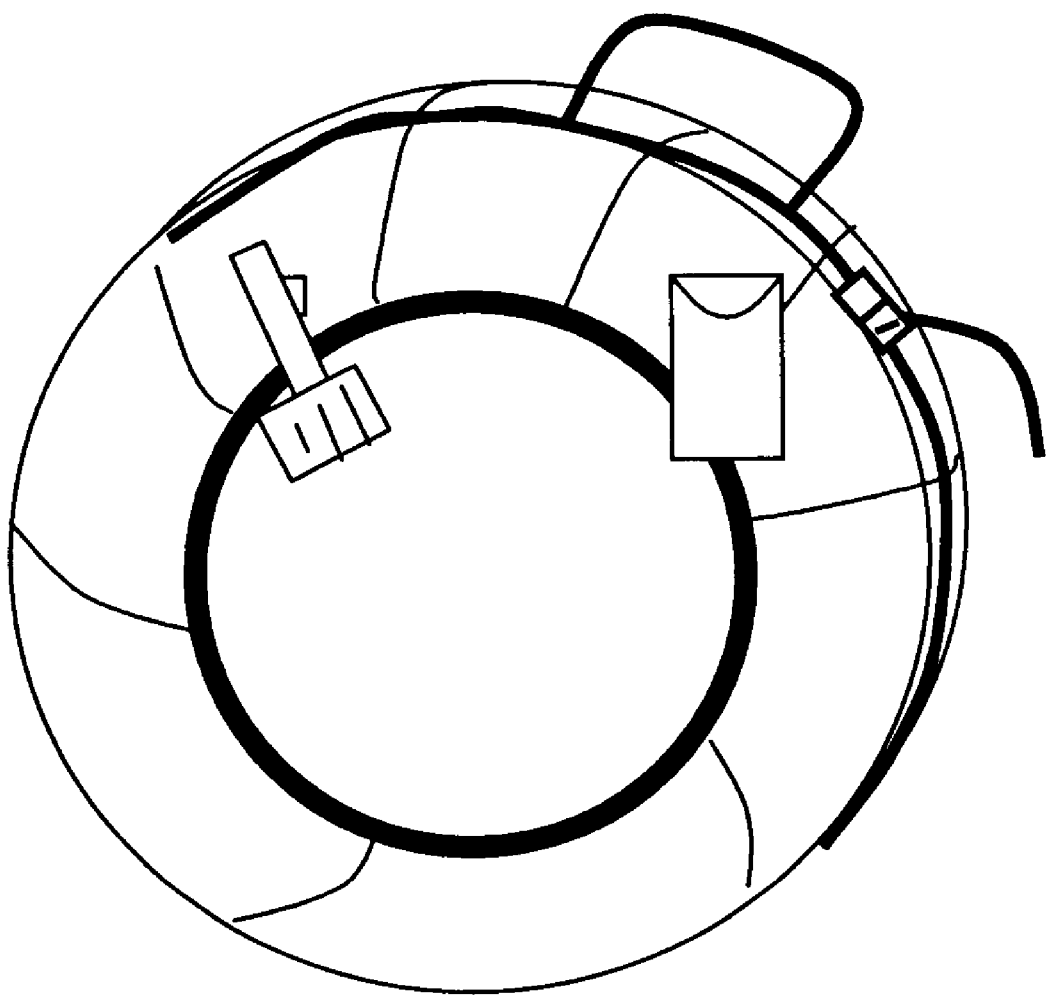
FIG. 7 shows a tire cover with attachment material and a removable strap and handle for lifting the tire.

Another embodiment is shown in FIG. 7 where the protective tire cover has attachment material on its front viewing side to hold accessories items such as a flashlight and or a pocket. The pocket can be use to hold various Items. A removable strap and handle is placed around the circumference of the cover while on the tire. The strap and handle can be adjusted around the tire and cover enabling one to pick up the tire by the handle. The attachment material can be made from snaps, buttons, hook and loop material etc.

From the description above, a number of advantages of my protective tire cover become evident:

(a) The protective tire cover can be easily placed on and removed from many sizes of tires because of its stretching ability.

(b) The protective tire cover is made with a bright color so it can be easily seen.

(c) Because it has the ability to be seen, it is placed on the tire in an emergency situation such as when stranded on the road with a flat tire.

(d) The middle opening allows access to the lug nuts, allowing a person to remove a flat tire while on the roadside and still be able to benefit from its ability to be seen by other motorists.

(e) Since the middle section is designed for ease in detaching and attaching either completely or partially, it is easily placed on or off in any situation.

(f) Generally tires are black and are hard to see in dimly lit situations, since the protective tire cover comes in various colors that have reflective abilities, it can become an important item when stranded with a flat tire.

(g) The protective tire cover helps prevent a person from getting filthy when working on, changing and handling a tire, whether it is spare tire or a tire already on a vehicle.

(h) The protective tire cover can remain on the flat tire when changing and then placing in the vehicle afterwards, keeping the tire itself from dirtying the vehicle.

(i) The inner side of the tire cover is designed for use on any tire whether slightly or heavily soiled, so a person handling a tire with the cover on can stay clean.

(j) The protective tire cover is made to easily fit over various size tires.

Operation—FIGS. 2, and 5

As shown in FIG. 2 we see a front view of the protective tire cover 10, two sections of the cover 10 are partially removed to view the tire 22 and wheel 24. The detachable center section 16 is attached making the complete protective tire cover 10. The manner of using the protective tire cover is basically the same as tire covers in present use. A person (not shown) FIG. 2 would place the protective tire cover 10 over the top front viewing portion of the tire 22 with their hands. The cover's 10 hollow infold 28 with elastic material inside is then placed over the tire 22 towards the rear circumference of the tire 22 as shown in FIG. 5. The person would then repeat the same procedure on the bottom front viewing portion of the tire 22. When the procedure is done, the cover 10 covers the front viewing side, circumference and back of the tire 22.

Figure 4:
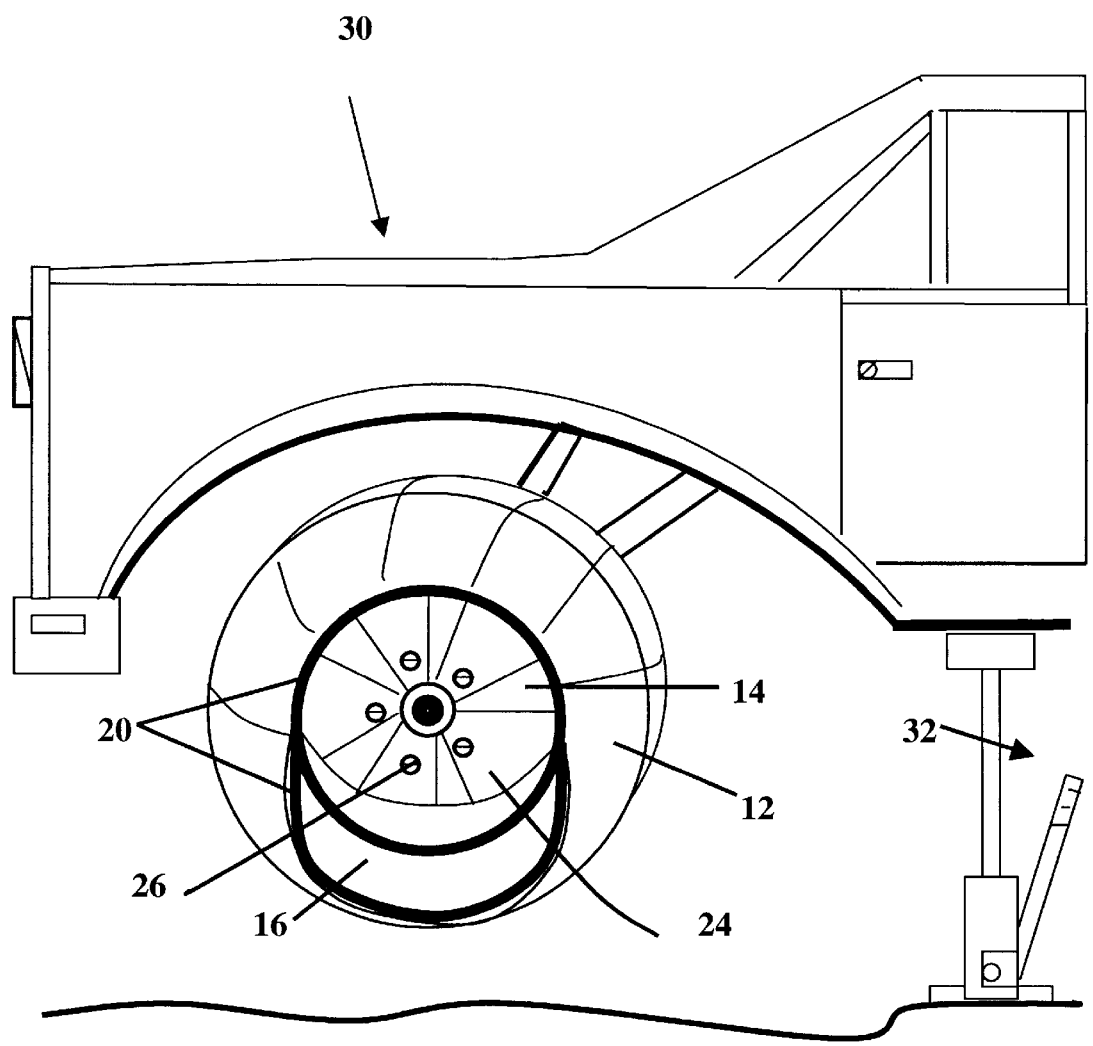
FIG. 4 shows a rear quarter of a car that is jacked up in order to change a flat tire, the tire having the protective tire cover on with the detachable center section partially removed.

FIG. 4 shows a rear quarter panel of a vehicle 30 and a tire jack 32. The person would jack up the vehicle and put the protective tire cover 10 on over the tire 22. They would then partially detach FIG. 4 or completely detach FIG. 5 the detachable center section 16 exposing the lugnuts 26. The person can then take off the lugnuts 26 while the circumferencial section 12 remains on the tire 22. The person can than attach the detachable center section 16 and handle the tire 22 without getting dirty.

Conclusion, Ramifications, and Scope

Accordingly, the reader will see that the protective tire cover of this invention can be used in various situations. It can be used as a preventive, such as in the case of not wanting one's vehicle or clothes from getting dirty; to being used in an emergency situation when stranded on the road. Furthermore, the protective tire cover has the additional advantages in that:

- it is used in an emergency situation, such as, when stranded on the road with a flat tire.
- it has a center opening which exposes the wheel allowing one to screw or unscrew the lug nuts while at the same time the tire cover's circumferencial section of material covers the tire;
- it has the ability to be seen on the road by other motorists because of its reflective abilities, therefore helping other motorists see a person when in the process of changing a flat tire;
- it is intended to be used on all styles of vehicles on the roadways such as cars, trucks, recreational vehicles, etc;
- it is used for handling wheels and tires when lifting, so one does not get dirty in any situation that a person needs to handle a tire; and
- it is a cover to be utilized rather than just seen as an appearance item.

Although the description above contains many specifications, these should not be construed as limiting the scope of the invention but rather as an exemplification of one preferred embodiment thereof. Many variations are possible, for example, the protective tire cover can be made out of any color, the detachable center section as well as the wide circumferential section of material can be made out of many shapes, such as, circular, oval, triangular, square, etc. The ring shape piece of hook and loop fastener material can vary in size and shape. The hook and loop fastening material can be secured by means of sewing, vulcanizing, snaps, buttons etc.

Thus the scope of the invention should be determined by the appended claims and their legal equivalents, rather than by the examples given.

I claim:

1. A protective tire cover for receipt over a vehicle tire and wheel with one size of this cover dimension to fit over many sizes of tire and wheel combinations, comprising:

a detachable center section of material covering said wheel;

a wide circumferential section of material to fit over the curved circumference of a tire;

means consisting of hook and loop material for removably attaching said detachable section of material to one front side of said wide circumferential section of material; and means for securing said protective cover over said tire.

2. The cover in claim 1 wherein said detachable section of material is shaped circular.

3. The cover in claim 2 wherein said circular shape is smaller in diameter than the smallest face of any side of a tire.

4. The cover in claim 1 wherein said means for securing said protective tire cover over said tire is a continuous hollow infold with an elastic cord slidably inserted on said wide circumferential section of materials rear side.

5. The cover in claim 1 wherein said detachable center section of material and said circumferential section of material are made from a flexible vinyl material.

6. The cover in claim 1 wherein said hook and loop material is ring shaped with a self adhesive backing.

7. The cover in claim 6 wherein one side of said ring-shaped hook and loop material adheres to said detachable section of material, the other side adheres to said wide circumferential section of material.

8. The cover in claim 1 wherein said protective tire cover can be made in any color.

\* \* \* \* \*